United States Patent [19]
Murray

[11] Patent Number: 5,437,322
[45] Date of Patent: Aug. 1, 1995

[54] LEAK RESISTANT MOUNTING SYSTEM FOR A RETRACTABLE AWNING

[75] Inventor: Brent W. Murray, Longmont, Colo.

[73] Assignee: Carefree/Scott Fetzer Company, Broomfield, Colo.

[21] Appl. No.: 155,932

[22] Filed: Nov. 22, 1993

[51] Int. Cl.6 ............................................. E04F 10/08
[52] U.S. Cl. ....................................... 160/61; 160/45; 160/67
[58] Field of Search ...................... 160/47, 61, 66, 67, 160/68; 135/89

[56] References Cited

U.S. PATENT DOCUMENTS 3,826,271  7/1974  Sattler et al. .................... 135/89
4,634,172  1/1987  Duda .
4,909,296  3/1990  Sellke et al. .
4,924,895  5/1990  Bailie ............................... 160/67 X
4,941,524  7/1990  Greer ............................... 160/67

Primary Examiner—Blair M. Johnson
Attorney, Agent, or Firm—Gary M. Polumbus; Holland & Hart

[57] ABSTRACT

A system establishing a leak resistant connection between a retractable awning and a support surface includes an elongated slat with male and female connection elements along opposite longitudinal edges, and an intermediate downwardly extending trough portion between the longitudinal edges to catch and drain water laterally away from the retractable awning.

14 Claims, 2 Drawing Sheets

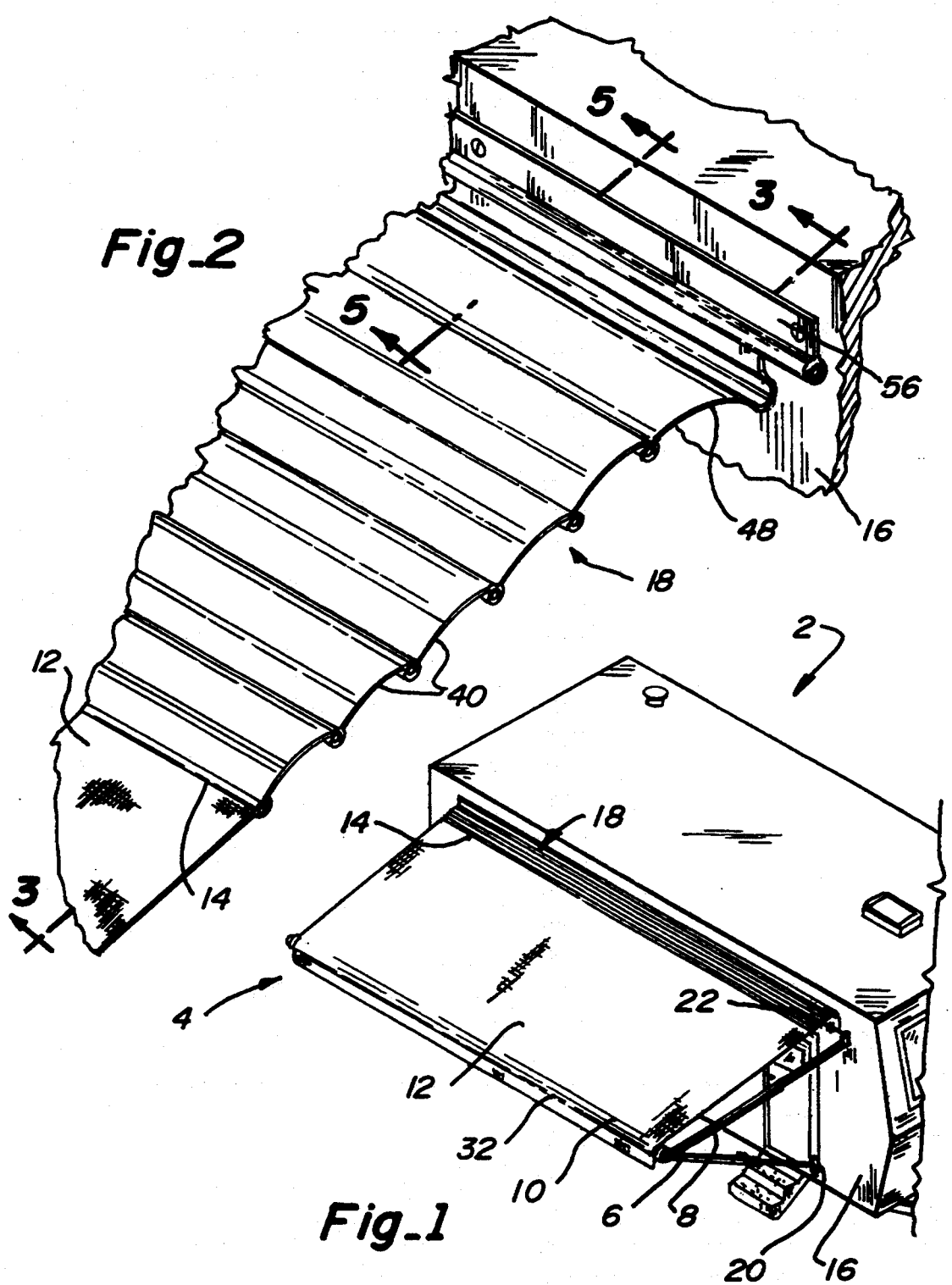

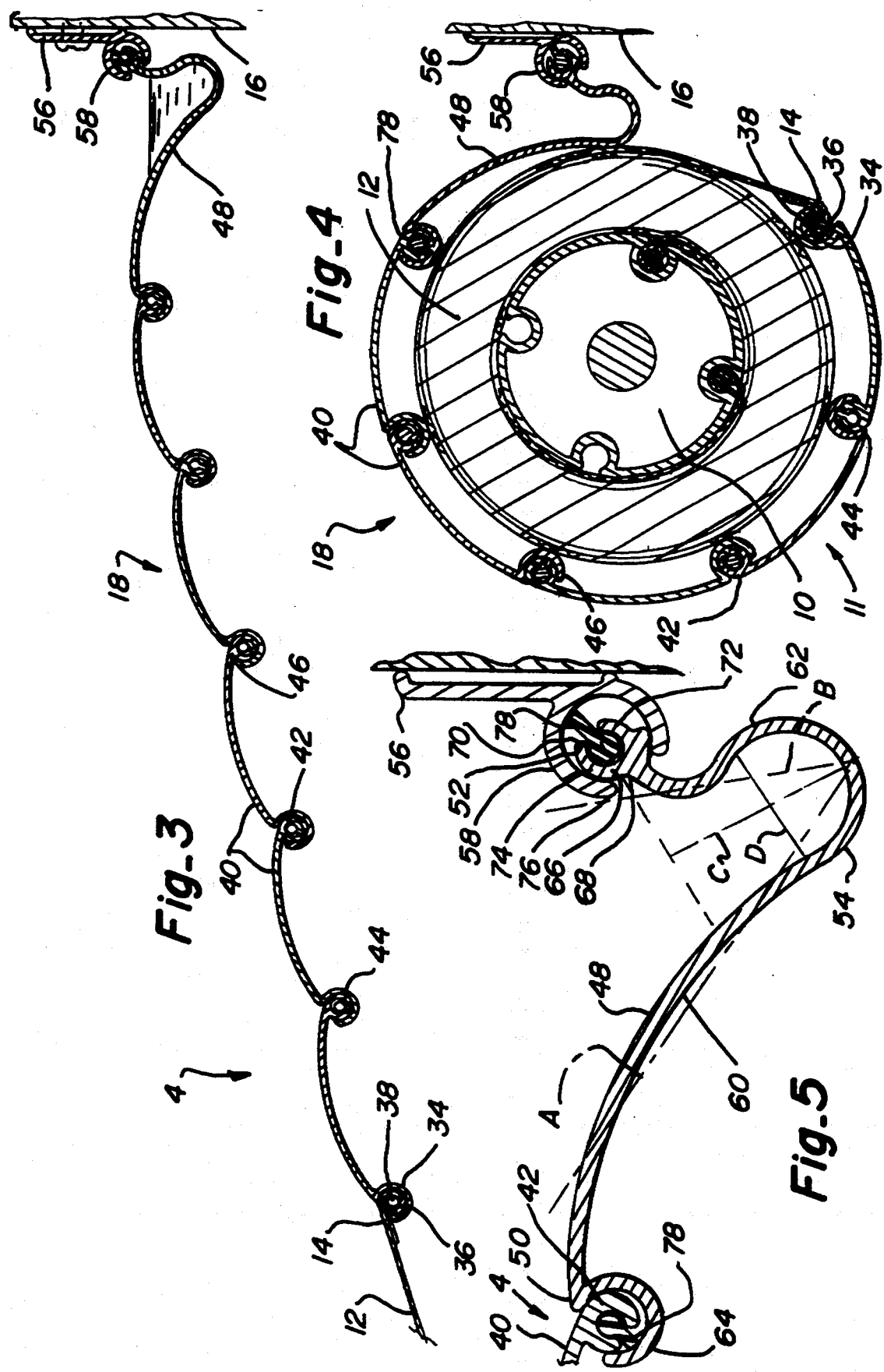

LEAK RESISTANT MOUNTING SYSTEM FOR A RETRACTABLE AWNING

BACKGROUND OF THE INVENTION

1. Field of the Invention

The present invention relates generally to retractable awnings, and more specifically to a mounting system for connecting a retractable awning to a support surface in a manner to prevent leakage of water through the connection.

2. Description of the Prior Art

Retractable awnings have been utilized for many years, particularly as awnings for windows or entry doors of building structures. The awnings are typically rolled out during daylight hours to block undesired sun rays and rolled in at night when the sun has gone down. Such awnings normally include a roll bar which is mounted in a movable manner along an outer edge of an awning so as to roll away from and back to the building as the awning is extended and retracted respectively.

Retractable awnings have more recently been mounted on the sides of mobile homes, recreational vehicles, travel trailers or the like. The additional function of awnings used in this manner is to provide shelter from the weather. Such retractable awnings normally include support posts for supporting the outer edge of the awning either by forming a brace from a side wall of the vehicle or by forming a ground support. While the outer edge of the awning is supported in this manner, the inner edge of the awning is typically supported by a mounting rail operably attached to the sidewall of the vehicle.

Historically, awnings were comprised of an awning sheet with a weatherized fabric material attached to its inner edge. The weatherized fabric material protected the awning sheet from environmental damage when the awning was rolled-up in its retracted position adjacent to the support structure. The inner edge of the weatherized fabric material was operably attached to the support structure by a conventional connection system.

In recent times, the weatherized fabric material has been in some instances replaced by a plurality of elongated slats pivotally connected together along their length in an articulated manner. The inner edge of the awning sheet is attached to the outermost one of the articulated slats, and the innermost slat is connected to the side of the vehicle. The slats protect the awning sheet from environmental degradation by encapsulating the awning sheet when the awning is rolled up in its retracted position.

A concern with all retractable awnings relates to the leakage of water through the line of connection between the awning and the support surface of the vehicle. Leakage can occur while the awning is in either the extended or retracted position. Water, from rain or condensation from roof-top air conditioners, can come into contact with the connector. Where the connector is not water-tight, leakage around the connector can occur. Also, the water that does not leak through the connector can flow out onto the awning, if extended, where it may leak through elsewhere. U.S. Pat. No. 4,909,296 issued to Richard G. Selke and Richard B. Rader, on Mar. 20, 1990, and entitled WATER-TIGHT SEALING SYSTEM FOR ARTICULATED SLATS acknowledges and addresses the problem of water leakage through the slats by establishing tiny rubber sealing strips in the connections between the articulated slats.

Historically, the mounting rail on the support surface to which the awning sheet is connected has been composed of metal. Since the articulated slats currently used to protect the awning sheet from the weather are also metal, the joint is characterized by metal-to-metal contact. The metal-to-metal contact is not inherently water-tight, and accordingly water is able to leak through the connection. The water that does not leak through the awning at the connector flows onto the awning and increases the risk of leakage between the articulated slats.

A recent development adapted to prevent leakage from between the awning and the support surface is described in U.S. Pat. No. 4,634,172 issued to Henry J. Duda on Jan. 6, 1987, and entitled FLEXIBLE HINGE RAIN SEALING MECHANISM. The Duda '172 mechanism prevents leakage between the awning and the support structure by utilizing a connector strap made of flexible material which is seated in opposing C-shaped grooves provided in a mounting rail on the vehicle wall and the innermost articulated slat. The Duda '172 connector forms a water-tight seal between the innermost articulated slat and the support structure when the connector is put under tension. Such a system works to effect a watertight seal between the support structure and the awning, but the flexible connector has a limited life, so the system is not totally satisfactory. Further, the flexible connector does not prohibit water from flowing onto the awning, nor is it of sufficient rigidity to keep the articulated slats from binding up when the awning is being retracted or extended.

It is to overcome the shortcomings in the prior art that the present invention was developed.

SUMMARY OF THE INVENTION

The present invention in general terms concerns a leak-proof connector for connecting an awning to a support surface, and more particularly to the use of such a connector between a support surface and a plurality of articulated slats attached to the inner edge of the awning sheet.

When a retractable awning is in use the outer edge of its awning sheet or canopy is operably supported either by a support arm extending from the support surface, or a ground support. The awning sheet's inner edge is connected to the outermost slat of the plurality of slats, with the innermost slat being operably connected by a connector to the support surface.

The present invention for establishing a water-tight connection between the awning and the support surface utilizes an elongated slat having an inner longitudinal edge, an outer longitudinal edge, and an intermediate trough portion extending downwardly between the inner and outer longitudinal edges. The outer longitudinal edge is operably connected to the innermost slat, while the inner longitudinal edge is operably connected to the support surface.

The elongated slat connector has a trough-like transverse cross-section to catch water that flows onto the awning near the support surface. The water then drains off either end of the elongated slat connector. The lateral drainage of the water diverts the water so that it does not flow across the connector and onto the awning, thus reducing leakage through the articulated slats or elsewhere through the awning.

The elongated slat connector is rigid, helping to prevent the articulated slats from binding up when the awning is being retracted or extended. Additionally the elongated slat connector does not engage the support surface directly at any point when the awning is extended or retracted and rolled up adjacent to the support surface.

Accordingly, it is a primary object of the present invention to provide a connector between an awning sheet and a support structure that prevents water leakage therethrough.

It is another object of the present invention to provide a connector to support a retracted awning adjacent to the support structure in such a way that the rolled up awning does not engage the support structure.

Still another object of the present invention is to provide a connector that is pivotally connected to the awning sheet and the support structure.

Yet another object of the invention is to provide a connector that is sufficiently rigid so that the awning, when being retracted or extended, does not bind.

It is a further object of the invention to provide a connector that has a relatively long life.

Additionally, an object of the invention is to provide a connector that diverts water flow laterally away from the awning.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a fragmentary isometric view of a retractable awning, in its extended position, on a camper trailer utilizing the elongated slat connector of the present invention.

FIG. 2 is an enlarged fragmentary isometric view of the retracable awning system including details of the articulated slats, the support surface, the awning sheet, the mounting rail and the elongated slat connector of the present invention.

FIG. 3 is a section taken along line 3—3 of FIG. 2.

FIG. 4 is a vertical section taken through the awning of FIG. 2 in its retracted position adjacent to the support surface.

FIG. 5 is an enlarged fragmentary section taken along 5—5 of FIG. 2.

DESCRIPTION OF THE PREFERRED EMBODIMENT

Referring first to FIG. 1, a travel trailer 2 having a retractable awning 4 incorporating the mounting or connection system of the present invention is illustrated and includes a pair of support arms 6 (only one shown), a pair of rafter arms 8 (only one shown), a roll bar 10 rotatably mounted on the distal ends of the support arms, an awning sheet 12 connected along an outer edge to the roll bar 10 and having its inner edge 14 operably connected to the side of the support surface 16 through a plurality of articulated slats 18.

The support arms 6 have a lower end pivotally connected to lower support brackets 20 mounted on the support surface 16, while the rafter arms 8 have upper ends pivotally connected to upper support brackets 22 on the support surface. The distal end of each rafter arm is slidably received in an associated support arm for movement along the length thereof. With this arrangement, the awning 4 can be reciprocally moved between the extended position of FIG. 1 and the retracted position of FIG. 4 in a manner described in more detail in U.S. Pat. No. 4,909,296, issued Mar. 20, 1990, which is hereby incorporated by reference.

The awning sheet 12, at its outer edge, is attached to the roll bar 10 in any conventional manner. Referring to FIG. 4., in the disclosed embodiment of the awning 4, the roll bar 10 is of elongated substantially cylindrical configuration having a plurality of grooves 24 of C-shaped cross section formed in the surface thereof. The outer edge 26 of the awning sheet 12 is hemmed to define a sleeve 28 which is inserted into one of the C-shaped grooves in the roll bar and it is retained therein by inserting a rod 30 or other tubular member through the sleeve. The rod has a diameter of sufficient size to be retained in the C-shaped groove. Similarly, a valence 32 might be attached to the roll bar in an identical manner as is illustrated in FIGS. 1 and 4.

The awning sheet 12, at its inner edge 14, is attached to a plurality of horizontally deployed articulated slats 18 in any conventional manner. Referring to FIGS. 3 and 4, in the disclosed embodiment of the awning 4, the outer edge 34 of the outermost one of the plurality of articulated slats is of C-shaped cross section. The inner edge of the awning sheet is hemmed to define a sleeve 36 which is inserted into the C-shaped outer edge 34 of the outermost slat and is retained therein by inserting a rod 38 or other tubular member through the sleeve 36. The rod has a diameter of sufficient size to be retained in the C-shaped groove of the outer edge 34 of the outermost one of the plurality of articulated slats. The awning sheet 12, the roll bar 10, the valence 32, and the plurality of articulated slats 18 make up the awning 4.

The articulated slats 18, which form an extension from the support surface 16 and a means for protecting the awning sheet 12 from environmental damage when rolled up in its retracted position, are best illustrated in FIGS. 2, 3, and 4. Each slat 40 is identical and may be made of a fairly rigid material such as aluminum. The slats 40 are elongated and of a length equal to the width of the awning sheet 12 and are slightly arcuate in transverse cross-section. Each slat has a bead or male connection element 42 along one edge and a mating female connection element 44 along the opposite edge so that the male connection element of one slat can be inserted into the female connection element of an adjacent slat to form an articulated tongue-in-groove type joint between the slats. The male and female connection elements 42, 44 are basically C-shaped grooves, where the opening of the groove defining a slot 46 is smaller in dimension than the interior diameter of the groove.

The male element 42 has a larger diameter than the width of the slot 46 in the female element 44 so that the male element can be pivotally received and retained in the groove of the female element of an adjacent slat 40. The male element is slidably inserted into the female element longitudinally for purposes of connecting adjacent slats.

The elongated slat connector 48 of the present invention, which is best illustrated in FIGS. 3, 4, and 5, includes an outer longitudinal edge 50, an inner longitudinal edge 52, and an intermediate trough portion 54 extending downwardly between the longitudinal edges. Each of the longitudinal edges form a connection element allowing the outer longitudinal edge to be secured to the innermost articulated slat 40, and the inner longitudinal edge to be secured to a mounting rail 56 on the support surface 16. The mounting rail is an elongated rigid element that is affixed to the supporting surface in any suitable manner and has a female connection element 58 along its length.

The intermediate trough portion 54 of the elongated slat connector has a basic trough shape, which might be defined as having an outer section 60 and an inner section 62 integrally formed along a hypothetical line of connection, and is best seen in FIG. 5. The outer longitudinal edge 50 is contiguous with the outer edge of the outer section 60, and the inner longitudinal edge 52 is contiguous with the inner edge of the inner section The outer section 60 has an arcuate transverse cross section that is upwardly convex while the inner section 62 has a substantially S-shaped transverse cross-section. The orientation of the inner and outer sections form an acute angle between the two sections as illustrated by the phantom lines A and B in FIG. 5.

The outer longitudinal edge 50 defines a female connection element 64 of C-shaped cross section that pivotally receives a corresponding male connection element 42 along the inner edge of the innermost articulated slat 40. The inner longitudinal edge 52 of the elongated slat connector 48 forms an elongated male connection element 66 of C-shaped cross section that is pivotally received in an elongated corresponding female connection element 58 on the mounting rail. The inner and outer longitudinal edges 52,50 of the elongated slat connector are sealingly connected to the mounting rail 56 and to the awning 4 to prohibit leakage in the most severe operating conditions where the water level rises above the connector elements 64,66. A sealing means such as the type disclosed in the aforementioned U.S. Pat. No. 4,909,296 can be used to sealingly connect the inner and outer longitudinal edges 50,52 of the elongated slat connector 48 to the mounting rail 56 and to the awning 4, respectively. The sealing means disclosed in the '296 patent is a small resilient strip of material 78 bridging the space between the connected male and female connection elements.

The pivotal connections facilitate extension and retraction of the awning 4 as will be appreciated in the description that follows. During retraction, referring to FIG. 4, the awning sheet 12 is rolled up around the roll bar 10 first, then the plurality of articulated slats 18 roll up around the roll bar and awning sheet to envelope them in a protective cover to minimize damage caused by weather or the like. When retracted, the awning sheet and the plurality of articulated slats are adjacent to the support surface 16, supported by both the elongated slat connector 48 attached to the mounting rail 56 and the support arms 6. The joint between the elongated slat connector and the mounting rail is constructed so that the elongated slat connector supports the retracted awning 4 without engaging the support surface 16. It is important to ensure that the elongated slat connector does not engage the support surface so that the support surface is not marked or structurally damaged by contact with the elongated slat connector.

The female connection element 58 on the mounting rail 56 interacts with the male connection element 66 on the elongated slat connector 48 to cause physical interference when the elongated slat connector is pivoted to its extreme downward position. Such interference acts to limit the rotation of the elongated slat connector. The physical interference limiting the downward rotation of the elongated slat connector is the result of the specially extruded shape of the male C-shaped connector 66 on the inner longitudinal edge 52 of the elongated slat connector.

As can be seen in FIG. 5, the C-shaped male connector 66 along the inner edge of the elongated slat connector 48 is integrally formed with a neck portion 68 substantially directly opposite the opening or slot 70 in the male connector 66, thus distinguishing a lower leg 72 from an upper leg 74 in the male connector 66. The lower leg 72 is thicker than the upper leg 74 at the point of connection with the neck portion 68. When pivotally inserted into the female C-shaped connector 58 on the mounting rail 56 and moved downwardly, the elongated slat connector pivots about the joint. As the elongated slat connector pivots downwardly, the lower, thicker leg 72 rests upon one edge of the slot 76 in the female C-shaped connector on the mounting rail and causes the upper leg of the male C-shaped connector 66 to forcibly contact the interior wall of the female C-shaped connector 58. The neck portion 68 then forcibly contacts the edge of the slot 76 in the female C-shaped connector 58 terminating any downward pivotal movement thus keeping the elongated slat connector from engaging the support surface 16. As a result of the physical interference in the joint between the elongated slat connector and the mounting rail, the elongated slat connector is prevented from contacting the support surface in either the extended or retracted position.

The elongated slat connector 48 is fabricated from a rigid, water impervious material, such as aluminum, so that it does not deflect significantly during retraction or extension. Deflection of the elongated slat connector during retraction or extension might cause the articulated slats 18 to become misaligned, inhibiting the free pivotal movement of the articulated slats, thereby interfering with retraction or extension. It should be appreciated that whether the awning is retracted or extended, the present invention prevents water from passing through the joint between the innermost articulated slat 40 and the support surface 16.

The linear distance between the inner longitudinal edge 52 and the outer longitudinal edge 50 of the elongated slat connector 48 is preferably in the range of one inch to four inches. The depth of the trough portion 54 as measured along line C of FIG. 5 is preferably in the range of one-eighth inch to about one inch. The maximum width of the trough portion 54 as measured along line D of FIG. 5 is preferably in the range of one-quarter inch to one inch. It that the trough extends up to an inch below an imaginary line interconnecting the inner and outer edges of the connector.

In operation of the awning, it will be appreciated that in the extended position illustrated in FIGS. 1, 2, and 3, the articulated slats 18 form an extension from the support surface 16 which is substantially co-planar with the awning sheet 12 itself. As appreciated from the foregoing, the plurality of articulated slats are operably connected to the support surface 16 by the elongated slat connector 48 so that water deposited in the elongated slat connector will not flow out across the articulated slats where leakage may occur. As water contacts the support surface or the elongated slat connector itself, it flows into the trough 54 of the elongated slat connector and then drains laterally to either end of the elongated slat connector and onto the ground. If the elongated slat connector is slanted along its length, the drainage is facilitated by gravity. If the elongated slat connector is not slanted to one end or the other, the drainage occurs anyway as the trough portion 54 has enough volume to allow some accumulation in the trough portion before it drains laterally by necessity.

Under all but the most severe conditions, the water level in the trough portion 54 does not rise to or above the connection elements 64,66 on either of the longitudinal edges 50,52 of the elongated slat connector 48. The water is maintained at this level because it continuously drains off the ends of the elongated slat connector. Because the water does not pool in the elongated slat connector and thereby stand at a level above the longitudinal edges 50,52, the elongated slat connector prevents water leakage.

Although the present invention has been described with a certain degree of particularity, it is understood that the present disclosure has been made by way of example, and changes in detail or structure may be made without departing from the spirit of the invention, as defined in the appended claims.

I claim:

1. In a system establishing a leak resistant connection between a retractable awning and a support surface for draining liquid therefrom, the awning being supported by the support surface along an inner edge and being movable between an extended position and a retracted position adjacent to the support surface, the inner edge of the awning being connected by a connector to the support surface, wherein the improvement resides in said connector comprising:
   a. a single-piece elongated slat having an inner longitudinal edge, an outer longitudinal edge, and an unobstructed intermediate trough portion extending downwardly between said inner and outer longitudinal edges, said trough portion being provided for draining substantial quantities of liquid;
   b. said inner longitudinal edge of said slat being connected to the support surface; and
   c. said outer longitudinal edge of said slat being connected to the awnings.

2. A system as recited in claim 1, wherein:
   a. said trough portion of said slat has an outer section and an inner section integrally connected along a hypothetical line of connection, said outer longitudinal edge being contiguous with an outer edge of said outer section and said inner longitudinal edge being contiguous with an inner edge of said inner section;
   b. said outer section having an arcuate transverse cross-section which is upwardly convex; and
   c. said inner section having a substantially S-shaped transverse cross-section.

3. A system as recited in claim 1, wherein said slat is constructed of a water impervious material.

4. A system as recited in claim 1, wherein:
   a. said inner longitudinal edge is pivotally connected to the support surface; and
   b. said outer longitudinal edge is pivotally connected to the awning.

5. A system as recited in claim 1, wherein:
   a. said inner longitudinal edge is sealingly connected to the support surface; and
   b. said outer longitudinal edge is sealingly connected to the awning.

6. A system as recited in claim 1, wherein said inner longitudinal edge is operably connected to the support surface such that the remainder of said slat is non-engageable with the support surface.

7. A system as recited in claim 1, wherein said slat is substantially rigid.

8. A system as recited in claim 1, wherein:
   a. the dimension between said inner longitudinal edge and said outer longitudinal edge is in the range of one inch to four inches;
   b. the depth of said intermediate trough portion is in the range of one-eighth inch to about one inch; and
   c. the maximum width of said intermediate trough portion is in the range of one-quarter inch to one inch.

9. A system as recited in claim 1, wherein the support surface further includes a mounting rail having a female connection element, wherein said inner longitudinal edge defines a male connection element pivotally received in the female connection element.

10. A system as recited in claim 1, wherein said awning includes an awning sheet having an inner edge, and a plurality of articulated slats extending parallel to said connector and operably connected to the awning sheet along the inner edge of the awning sheet, and wherein
    a. said outer longitudinal edge defines a female connection element;
    b. said innermost articulated slat has a male connection element and is pivotally received in said female connection element.

11. A system as recited in claim 2, wherein the general orientation of said inner section and the general orientation of said outer section define an acute angle.

12. A system as recited in claim 1, wherein
    a. said trough portion of said slat has an outer section and an inner section integrally connected along a hypothetical line of connection, said outer longitudinal edge being contiguous with an outer edge of said outer section and said inner longitudinal edge being continuous with an inner edge of said inner section; and
    b. said outer section extending continually downwardly from said outer longitudinal edge to said hypothetical line of connection, and said inner section extending continually downwardly from said inner longitudinal edge to said hypothetical line of connection.

13. A system as defined in claim 1, and wherein said trough extends up to an inch below an imaginary line interconnecting said inner and outer longitudinal edges.

14. In a system establishing a connection between a retractable awning and a support surface, the awning being supported by the support surface along an inner edge and being movable between an extended position and a retracted position adjacent to the support surface, the inner edge of the awning being connected by a connector to the support surface, wherein the improvement resides in said connector comprising:
    a. an integrally formed elongated slat having an inner longitudinal edge, an outer longitudinal edge, and an intermediate trough portion extending downwardly between said inner and outer longitudinal edges;
    b. said inner longitudinal edge of said slat being operably connected to the support surface;
    c. said outer longitudinal edge of said slat being operably connected to the awning; and
    d. wherein said trough portion of said slat has an outer section and an inner section integrally connected along a hypothetical line of connection, said outer longitudinal edge being contiguous with an outer edge of said outer section and said inner longitudinal edge being contiguous with an inner edge of said inner section, said outer section having an arcuate transverse cross-section which is upwardly convex, and said inner section having a substantially S-shaped transverse cross-section.

* * * * *